United States Patent Office 3,804,939
Patented Apr. 16, 1974

3,804,939
METHOD OF PRECIPITATING AMERICIUM OXIDE FROM A MIXTURE OF AMERICIUM AND PLUTONIUM METALS IN A FUSED SALT BATH CONTAINING PuO₂
William R. Strickland, Kearny, Ariz., and Robert G. Auge, Boulder, and James C. Brown, Broomfield, Colo., assignors to the United States of America as represented by the United States Atomic Energy Commission
Filed June 21, 1972, Ser. No. 265,055
Int. Cl. C01g 56/00; C22b 61/04
U.S. Cl. 423—5    4 Claims

ABSTRACT OF THE DISCLOSURE

Method of recovering americium from plutonium metal source material which contains americium comprising contacting molten plutonium metal source material with an about eual weight of molten equimolar salt mixture of sodium chloride and potassium chloride containing not greater than about 25 weight percent (w/o) plutonium oxide as reductant to convert the americium to americium oxide, thereafter separating the salt mixture containing the americium oxide from the plutonium and subsequently separating americium from the salt mixture.

BACKGROUND OF INVENTION

The increasing demand for americium (Am) in various applications and in research coupled with the fact that americium itself is a product of plutonium (Pu) and may interefere with plutonium applications has established the need for an economical and efficient method of separating americium from plutonium. Prior art processes, such as that of U.S. Pat. No. 3,460,917, separate americium from plutonium using an equimolar salt mixture of sodium chloride and potassium chloride with magnesium chloride as the reductant. This and similar processes in some instances present drawbacks such as generation of larger than desired quantities of salt, recovery of not as great quantities as desired of americium in one contact step, subsequent problems in cleaning up and/or disposing of contaminated salt, and extended use of equipment, such as furnaces, which tend to decrease service life. The economic value of americium and plutonium is such that recovery and purification of even small additional amounts of either is of considerable value.

SUMMARY OF INVENTION

It is an object of this invention to provide americium recovery rates exceeding around 95% of original americium content.

It is another object of this invention to achieve high recovery rates using only one contact step.

It is a further object of this invention to provide a use for high fired, highly refractory plutonium dioxide as reductant.

It is a still further object of this invention to eliminate or minimize special procurement and pretreatment of magnesium chloride (MgCl₂) reductant in americium separation from plutonium by using PuO₂ which is readily available as the air oxidation product of plutonium metal.

It is another object of this invention to provide a process which reduces equipment tie up time over prior art processes.

Various other objects and advantages will become apparent from the following description of this invention, and the most novel features will be pointed out with particularity hereinafter in connection with the appended claims. It is understood that various changes in the details, materials and process steps which are herein described and illustrated to better explain the nature of the invention may be made by those skilled in the art without departing from the scope of this invention.

The invention comprises, in brief, contacting and agitating molten plutonium metal source material containing americium with an about equal weight of equimolar salt mixture of sodium chloride and potassium chloride containing between about greater than 0 to about 25 weight percent of plutonium oxide to effect separation of americium into the molten salt bath.

DETAILED DESCRIPTION

Figure 1:
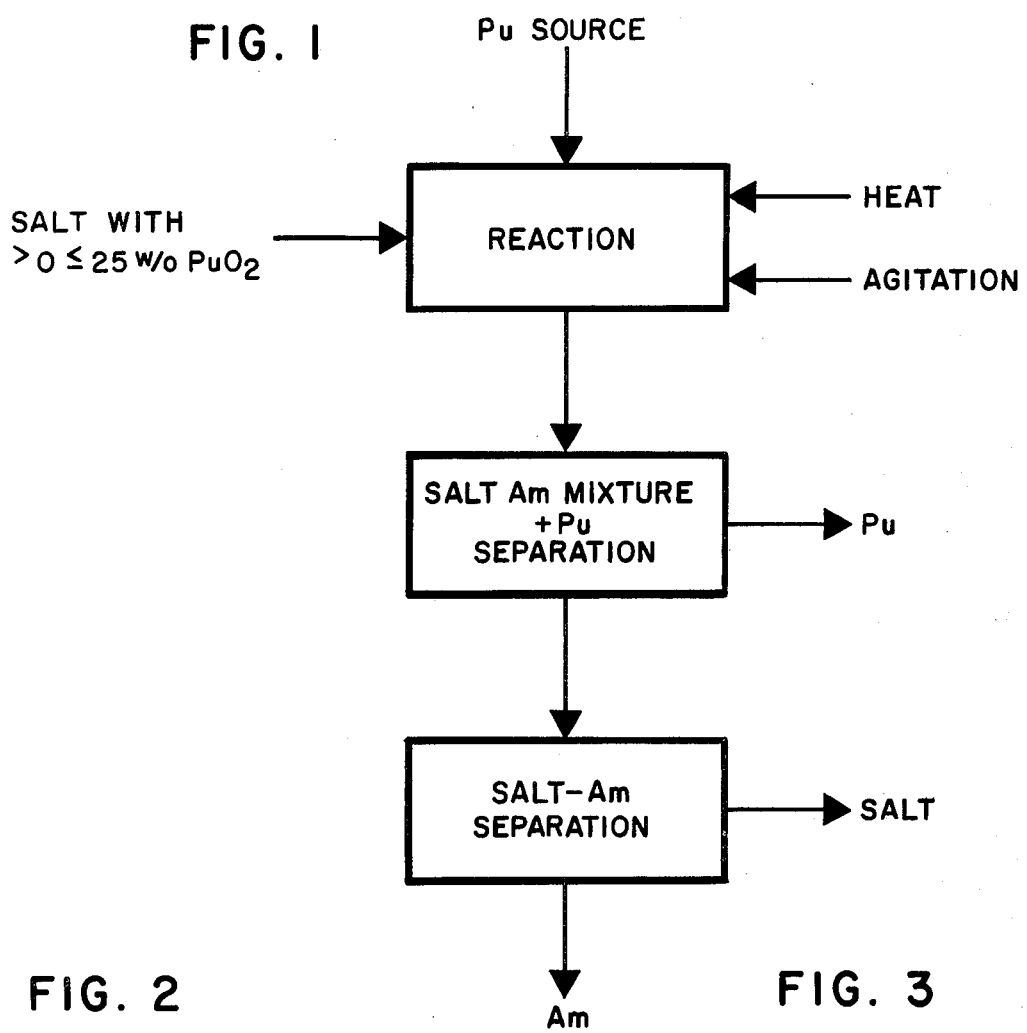
FIG. 1 illustrates a flow process showing the various steps in the americium separation from plutonium.

The separation of americium from plutonium metal source material may be effected by the process shown in FIG. 1, whereby the plutonium material is placed in a suitable receptacle such as a tantalum crucible, and a quantity of salt mixture about equal in weight to the plutonium metal is added. Although the ratio of weight of salt mixture containing desired plutonium oxide to weight of plutonium feed metal may be from about 0.2 to about 1.5, a ratio of about 0.25 may be preferred. The salt mixture is composed of equimolar sodium chloride and potassium chloride containing something greater than 0 to about 25 weight percent plutonium oxide. The term plutonium oxide as used herein is intended to include not only PuO₂ but also various stoichiometries thereof.

The crucible may then be placed in a furnace with an inert atmosphere provided by alternately evacuating the crucible and backfilling a suitable number of times (such as about 3 times) with an inert gas such as argon. The crucible containing the reaction mixture may then be heated until the internal temperature is between about 730° C. and about 800° C. and when within that range, the melt stirred through suitable means for about one hour. The americium may be removed or extracted from the plutonium feed metal by or into the salt flux or mixture during this heating and mixing. Stirring may then be stopped and the plutonium feed metal which has had the Am extracted therefrom may be separated or drawn off from the reaction vessel in a suitable manner, such as through known density separation processes, or the crucible contents may be allowed to cool and harden into plutonium buttons which may thereafter be removed and separated in a conventional manner.

A method which may be used for recovering americium from the above cooled and hardened molten salt residues after removing the plutonium button formed by suitable means, may comprise dissolving the salt residues in hot (about 100° C.) water, or preferably in hot (about 110° C.), about 1 molar (M) hydrochloric acid and thereafter precipitating the americium and whatever plutonium is present, as hydroxide using about 3 M potassium hydroxide. The resulting precipitate may be filtered through a suitable filtering medium and the precipitate subsequently redissolved in about 8 M nitric acid. The resulting nitrate solution containing americium and plutonium may then be treated by generally well known methods of aqueous ion exchange to separate the two elements, followed by recovery of these elements by procedures well known in the art of actinide chemistry.

Figure 2:
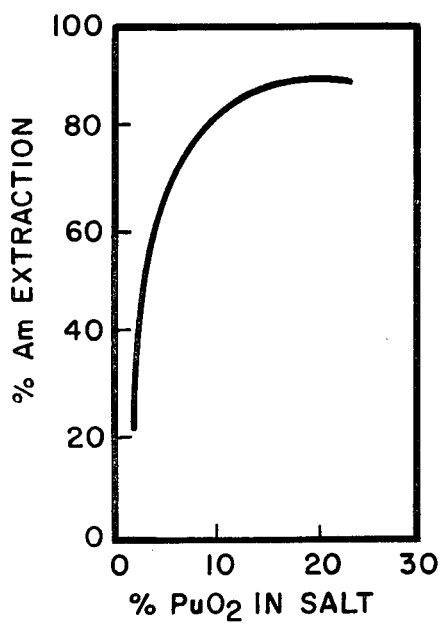
FIG. 2 graphically illustrates americium (Am) extraction efficiency as a function of plutonium oxide concentration in the equimolar molten salt mixture of sodium chloride and potassium chloride.

FIG. 2 graphically illustrates the americium extraction percentages as a function of concentration of $PuO_2$ in the salt flux. As can be seen, percent americium extraction reaches about 95% at about 20 weight percent (w/o) of $PuO_2$ in the salt flux using a weight ratio of salt mixture to feed metal of about 1. This recovery is much greater than that attainable in the prior art and is performed faster. Further, magnesium, often a component of the system used in other extraction processes, is not introduced as a contaminant which must be later removed. Use of $PuO_2$ is facilitated by the fact that it may be the air oxide of plutonium and may not require extensive pretreatment to insure its dryness and purity. Further, high fired, highly refractory $PuO_2$ may be used advantageously in this process. An advantage in using this type of $PuO_2$ is that it is extremely difficult to dissolve in other reactions.

Figure 3:
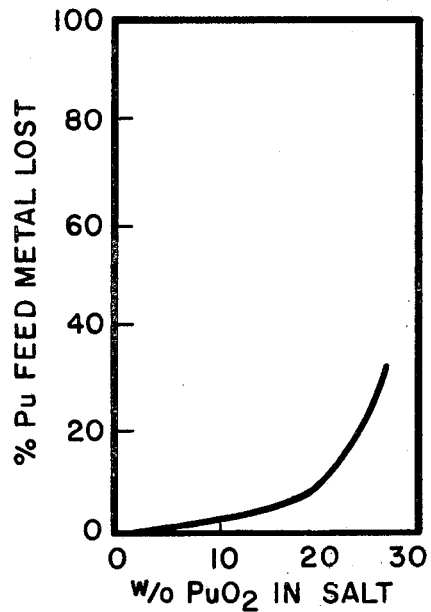
FIG. 3 graphically illustrates percent feed metal lost as a function of plutonium oxide concentration in the molten equimolar salt mixture of sodium chloride and potassium chloride.

FIG. 3 graphically illustrates, at a ratio of salt mixture containing $PuO_2$ to plutonium feed metal of about 1, the percent Pu feed metal lost to the salt flux versus the percent plutonium oxide concentration. As clearly seen, below about 20 w/o there is little loss of feed metal but at about 20 w/o $PuO_2$ concentration the percent feed metal lost begins to rise and beyond 25 w/o $PuO_2$ loss is undesirably high. Below about 25 w/o however, this process is superior to prior art processes since more americium may be separated from plutonium in a single contact step without the introduction of a foreign material such as magnesium, versus the two or more contact steps of prior art processes. It may be preferred therefore to maintain the weight percent of plutonium oxide at from about 18 to about 22 w/o.

What is claimed is:

1. A method for separating americium from plutonium metal which contains americium consisting of contacting said plutonium metal with an about equal weight of an equimolar sodium chloride and potassium chloride salt mixture containing more than 0 w/o up to about 25 w/o plutonium dioxide, heating said plutonium metal and said salt mixture in an inert atmosphere to molten condition and to temperature of from about 730° C. to about 800° C., stirring said melt to effect reaction of said americium with said plutonium dioxide forming americium oxide and separation of said americium oxide from said plutonium metal into said salt mixture, and separating said salt mixture with americium from said plutonium.

2. The method of claim 1 including continuing said heating for a period of about one hour.

3. The method of claim 1 wherein the weight percent of plutonium dioxide is from about 18 to about 22.

4. The method of claim 1 wherein the ratio of the weight of said salt mixture containing said plutonium dioxide to the weight of said plutonium metal source material is from about 0.2 to about 1.5.

References Cited
UNITED STATES PATENTS

| 3,420,639 | 1/1969 | Mullins et al. | 423—5 |
| 3,460,917 | 8/1969 | Long | 423—3 |
| 3,147,109 | 9/1964 | Knighton et al. | 75—84.1 R |
| 3,152,887 | 10/1964 | Lawroski | 75—84.1 R |

CARL D. QUARFORTH, Primary Examiner

R. L. TATE, Assistant Examiner

U.S. Cl. X.R.

75—84.1 A, 84.1 R; 252—301.1 R; 423—250, 251